No. 824,293. PATENTED JUNE 26, 1906.
J. GODFREY.
APPLIANCE FOR STRIPPING PASTEBOARD BOXES FROM HOT FORMING DIES.
APPLICATION FILED FEB. 8, 1906.

WITNESSES
H. A. Lamb
M. T. Lougden

INVENTOR
Jonathan Godfrey
BY
ATTORNEY

UNITED STATES PATENT OFFICE.

JONATHAN GODFREY, OF BRIDGEPORT, CONNECTICUT, ASSIGNOR TO THE COMPRESSED PAPER BOX COMPANY, OF BRIDGEPORT, CONNECTICUT, A CORPORATION OF CONNECTICUT.

APPLIANCE FOR STRIPPING PASTEBOARD BOXES FROM HOT FORMING-DIES.

No. 824,293.     Specification of Letters Patent.     Patented June 26, 1906.

Application filed February 8, 1906. Serial No. 300,181.

*To all whom it may concern:*

Be it known that I, JONATHAN GODFREY, a citizen of the United States, residing at Bridgeport, in the county of Fairfield and State of Connecticut, have invented certain new and useful Improvements in Appliances for Stripping Pasteboard Boxes from Hot Forming-Dies; and I do hereby declare the following to be a full, clear, and exact description of the invention, such as will enable others skilled in the art to which it appertains to make and use the same.

My invention relates to appliances for stripping pasteboard boxes from hot forming-dies; and it consists of certain arrangements of parts and combinations of parts, such as will be hereinafter fully set forth, and particularly pointed out in the claims which conclude this application.

The object of my invention is to provide for rapidity in the manufacture of these boxes without marring or distorting them, this being effected mainly by stripping the boxes from the forming-dies by instrumentalities applied and operating exterior of the dies.

Figure 1:
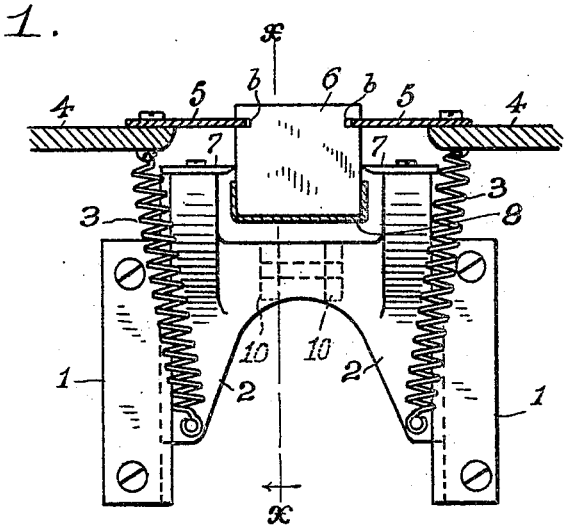
Figure 2:
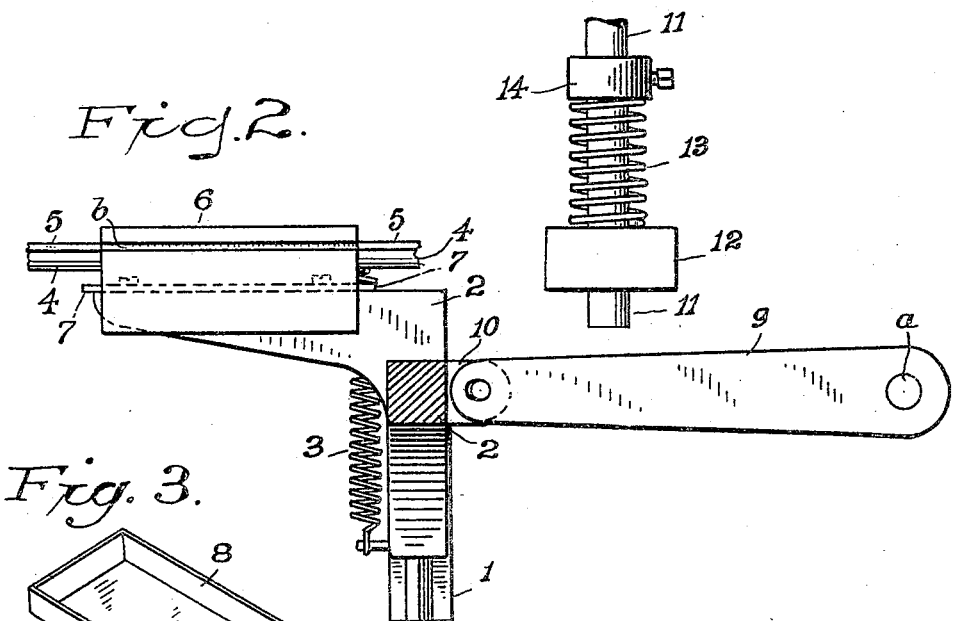
Figure 3:
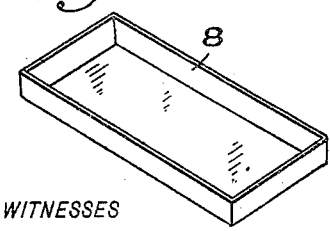

In the accompanying drawings, Figure 1 is a sectional elevation with the tappet-rod omitted, illustrating an arrangement of operative parts whereby my invention may be practiced; Fig. 2, a section at the line *x x* of Fig. 1 and showing the tappet-rod in operative position, and Fig. 3 a perspective view of a box as it appears after being stripped from the forming-die.

Similar characters of reference denote like parts in the several figures of the drawings.

My present improvement refers solely to the making of pasteboard boxes by the hot process, which consists in forming the boxes on hot dies and subsequently baking them while on the dies, so as to drive out all moisture.

In my former United States Letters Patent, Nos. 483,957 and 483,958, issued to me October 4, 1892, I showed and described certain means for stripping these baked boxes from the forming-dies, which means consisted of a stud that operated through the center of the dies against the bottom of the boxes; but I have ascertained that the discharge of the boxes by means of devices that operate in this manner not only mars the box, but bulges the bottom of the box, so that the latter becomes distorted. My present invention cures this defect and accomplishes a result hitherto deemed impossible in the manufacture of pasteboard boxes by the hot process.

I have not considered it necessary to show the intricate machine elements which are in the making of the boxes associated with my improvement, since they form no part of my present invention, and I have therefore illustrated merely the parts that are immediately instrumental in bringing about the result aimed at.

1 represents stationary ways within which a frame 2 slides freely, and 3 represents coil-springs whose ends are secured, respectively, to the lower portions of said frame and to the stationary bed 4 of the machine, the function of these springs being to normally elevate said frame.

5 represents horizontally-disposed fins secured on the bed 4, and 6 is one of the forming-dies, having in opposite sides grooves *b*, within which said fins project, whereby said die is supported and is capable of a free sliding movement.

7 represents the strippers, secured to the top portion of the frame on opposite sides of the die and extending very close to the latter and in normal position being immediately above the edges of a box 8, that has been formed around the die.

9 is a lever whose rear end is pivoted around a stationary rod or stud *a* and whose forward end is loosely pivoted between ears 10, that extend from the frame 2.

11 is a tappet-rod which extends freely through a lug 12, that projects from a stationary element, and 13 is a coil-spring around said rod and confined between the lug and a collar 14, secured to the rod, the function of this spring being to keep this rod normally elevated.

The operation of my improvement is as follows: The parts being in their normal position, as shown in the drawings, with a box on the forming-die, the rod 11 is depressed against the lever 9, thereby forcing the frame 2 downwardly and causing the strippers 7 to wipe the box from the former. The means employed to depress the rod 11 is preferably the gate of an ordinary power-press, and the forming-dies, with the boxes thereon, are successively carried through a baking-oven and brought into position for the stripping operation; but this press and the instrumentalities which form the boxes around the dies, heat the latter, and deliver them in proper position for this stripping operation are no part of my present invention and are, in fact, set forth in my Letters Patent above mentioned, and, as before stated, it is not deemed necessary to show or describe them herein.

While I have shown and explained certain mechanical elements for operating the strippers proper, it will be obvious that many changes may be made in this respect without departing from the spirit of my invention, the gist of which rests in the broad idea of stripping the boxes externally from a hot forming-die.

What I claim as new, and desire to secure by Letters Patent, is—

1. In combination with a forming-die around which pasteboard boxes are formed, a vertically-movable frame having side portions extending upwardly on opposite sides of said die, and a stripper secured to each of said upwardly-extending side portions and disposed to project in close proximity to the opposite sides of said forming-die and normally at intermediate points between the top and bottom faces of said die.

2. In combination with a forming-die around which pasteboard boxes are formed, a vertically-slidable frame carrying a pair of spaced strippers operating on opposite sides of said die, and means for sustaining said frame so that said strippers will normally be retained at points above the top edges of the box being formed.

3. In combination with a forming-die, around which pasteboard boxes are formed, a spring-pressed frame having strippers arranged to normally extend on opposite sides of said die and above the top edges of the pasteboard box, and means for operating said frame downwardly.

4. In combination with a forming-die around which pasteboard boxes are formed, a pair of ways, a frame sliding in said ways and having upwardly-projecting side portions extending on opposite sides of said die, a stripper secured to each of said side portions, springs secured to said frame and the bed of the machine, and means connected to said frame for operating the same downwardly.

5. In combination with a die around which pasteboard boxes are formed, a stripping-frame operating on opposite sides of said die, means for sustaining the strippers of said frame at points above the top of the box being formed, and means for depressing said frame to release said box from the die.

6. In combination with a die around which pasteboard boxes are formed, depressible stripping means having inwardly-extending parts to engage the top portion of said box and to actuate said box out of engagement with said die.

In testimony whereof I affix my signature in presence of two witnesses.

JONATHAN GODFREY.

Witnesses:
F. W. SMITH, Jr.,
M. T. LONGDEN.